United States Patent [19]
Doi et al.

[11] Patent Number: 4,907,034
[45] Date of Patent: Mar. 6, 1990

[54] IMAGE RECORDER USING RECORDING HEAD

[75] Inventors: Atsuhiro Doi; Takatoshi Otsu, both of Kanagawa, Japan

[73] Assignee: Fuji Photo Film Co., Ltd., Kanagawa, Japan

[21] Appl. No.: 164,031

[22] Filed: Mar. 4, 1988

[30] Foreign Application Priority Data

| Mar. 6, 1987 | [JP] | Japan | 62-51286 |
| Mar. 20, 1987 | [JP] | Japan | 62-67409 |
| Apr. 14, 1987 | [JP] | Japan | 62-91798 |
| Apr. 14, 1987 | [JP] | Japan | 62-91799 |
| Apr. 14, 1987 | [JP] | Japan | 62-91800 |
| Apr. 15, 1987 | [JP] | Japan | 62-92633 |
| Apr. 15, 1987 | [JP] | Japan | 62-92634 |

[51] Int. Cl.⁴ .............................. G03G 15/00
[52] U.S. Cl. .................... 355/327; 355/228; 355/229
[58] Field of Search ............ 355/1, 3 R, 4, 14 R, 355/14 E, 326, 327, 328; 346/151, 153.1, 155, 157, 76 R, 76 L, 78; 358/100, 300, 296, 901

[56] References Cited

U.S. PATENT DOCUMENTS

| 4,447,126 | 5/1984 | Heidrich et al. | 355/1 X |
| 4,462,662 | 7/1984 | Lama | 355/1 X |
| 4,589,736 | 5/1986 | Harrigan et al. | 355/1 X |
| 4,653,895 | 3/1987 | Deguchi et al. | 355/1 |
| 4,748,680 | 5/1988 | Margolin | 355/4 X |
| 4,772,922 | 9/1988 | Kanahara et al. | 355/4 X |

Primary Examiner—A. C. Prescott
Attorney, Agent, or Firm—Sughrue, Mion, Zinn, Macpeak & Seas

[57] ABSTRACT

An image recorder which requires a smaller amount of space for installation and which employs a simplified structure and eliminates moving parts in an image recording section. A recording head is provided having three linear arrays of light-emitting elements, such as light-emitting diodes, emitting light in the three primary colors RGB and arranged in a direction perpendicular to a direction in which a color photosensitive material is conveyed. The light-emitting elements of each array may be mounted on a respective flat plate base along side edge faces thereof. The side edge faces of the various bases are arranged opposite to one another.

19 Claims, 14 Drawing Sheets

IMAGE RECORDER USING RECORDING HEAD

BACKGROUND OF THE INVENTION

The present invention relates to a compact image recorder for recording a color image on a color photosensitive material at high speed.

Heretofore, a drum recording system has generally been used to record color images on a color photosensitive material by photo-exposing with electroimage signals. In this recording system, a photosensitive material cut to a desired size is wound on a drum and the drum turned to thereby modulate point sources scanned parallel to the drum axis.

However, this system has several disadvantages: recording times tend to be long as the speed of rotation of the drum is restricted; it takes a significant amount of time to wind and unwind the photosensitive material on and from the drum; the recording mechanism is complicated; the system itself is not only large in size but also complicated; and the number of sheets processed per unit time is small.

FIGS. 1 and 2 show an example of the conventional image recorder (see Japanese Patent Application (OPI) No. 279973/87). In this image recorder 10, a magazine 14 containing a heat development photosensitive material 16 as a color photosensitive material is mounted on a machine body 12. The heat development photosensitive material 16 inside the magazine 14 is drawn out and cut in predetermined lengths before being wound on the outer periphery of an exposure drum 20 (in the direction of an arrow A). An exposure head 22 having luminous elements of trichromatic point sources is installed opposite the outer periphery of the exposure drum 20. The exposure drum 20 is reversely turned after the exposure of one image plane. The heat development photosensitive material is then stripped therefrom with a scraper 24 and sent via a water coater 26 to a developing transfer unit 28. On the other hand, an image receiving material 32 contained in a tray 30 is sent to the developing transfer unit 28 and superposed on the heat development photosensitive material 16 before being heated by a heater in the developing transfer unit 28. The heat development photosensitive material 16 is thereby developed and the developed image is transferred to the image receiving material 32. After the completion of transfer, the heat development photosensitive material 16 is sent to a waste tray 32 via a peeler 36, whereas the image receiving material 32 is sent to a discharge tray 42 via a dryer 40.

As shown in FIG. 2, the exposure head 22 is turned (in the direction of the arrow A) at high speed and used to perform a main scanning operation while the heat development photosensitive material 16 is wound on the exposure drum 20. The exposure head 22 is provided with three primary luminous elements 44, which are employed to perform subscanning in the direction of an arrow B. The luminous elements 44 are positioned along a guide bar 46 disposed on an axis parallel to the exposure head 22. A pair of pulleys 48, 50 disposed on a parallel axis and a wire 52 wound on the pulleys are employed to move the exposure head 22 to perform the subscanning operation. One end of the wire is fastened to the exposure head 22 and its mid-portion is wound on the pulleys 4, 50, while the other end is fitted to the exposure head 22 via a tension providing member 54.

After being cut by a cutter 18 in predetermined lengths, the heat development photosensitive material 16 within the magazine 14 is wound on the outer periphery of the exposure drum 20. The exposure drum 20 is turned by a motor (not shown) in the direction A. Each time the pulley 48 is turned, the exposure head 22 performs a subscanning operation while moving in the direction B. The subscanning operation is such that exposure is effected by a luminous elements only when the pulley 48 is driven clockwise (C). When the exposure drum 20 is reversely turned, the exposed heat development photosensitive material 16 is stripped by the scraper 24 from the outer periphery of the exposure drum 20 and sent via the water coater 26 to the developing transfer unit 28.

The image receiving material 32 taken out of the tray 30 is sent to the developing transfer unit 28 and superposed on the heat development photosensitive material 16 so that the emulsion layers of both the materials adhere to each other. When the heater within the developing transfer unit 28 is operated, the image exposed to the heat development photosensitive material 16 is subjected to heat development, whereby the resulting image is transferred to the image receiving material 32. Image transfer is carried out with certainty because water is applied by the water coater 26 to the emulsion layer of the heat development photosensitive material 16. The heat development photosensitive material 16 from which the image has been transferred is discharged into the waste tray 38, whereas the image receiving material 32 is discharged via the dryer 40 into the discharge tray.

In the conventional image recorder thus constructed, the heat development photosensitive material 16 cut in lengths is wound on the exposure drum to record a color image, and the exposed color photosensitive material is sent to the processing unit for processing purposes. It takes a significant amount of time to wind and unwind the photosensitive material on and from the exposure drum 20. Moreover, since the main scanning and the subscanning with the three luminous elements 44 for effecting trichromatic exposure corresponding to the spectral sensitivity characteristics of the heat development photosensitive material 16 are employed to record an image on the heat development photosensitive material 16 of the exposure head 20, the total recording time is considerably long. Further, the recording size is disadvantageously limited to what corresponds to the diameter of the exposure drum 20.

A light-emitting diode can be uses as an image recording element for a scanning type color image recording system employing a silver salt photosensitive material (color paper, color image recording material for a heat developing transfer system, etc.). In order to match the spectral characteristics of the light-emitting diode and those of the photosensitive material, the following may be used:

R (red) light → C (cyan) color development
G (green) light → M (magenta) color development
B (blue) light → Y (yellow) color development or
IR (infrared) light → C color development
G light → M color development
Y light → Y color development In general, the luminous output of a B light-emitting diode is small, and hence the use of IR, G and Y light is advantageous when a scanned image is to be recorded. Recording using a scanning process, namely, a process employing a drum scanning system, can be readily implemented using light-emitting diodes. However, an exposure method using such a point source is disadvantageous in that recording time tends to be long as sequential scanning is essential.

To eliminate such shortcomings, it is possible to use a light source formed of an array of light-emitting diodes mounted on a plate-like recording support 1 as shown in FIG. 3.

A light-emitting diode is, as shown in FIG. 4, generally produced by growing an epitaxial layer 23 on a monocrystalline substrate 21 of GaAs or GaP and further forming a p-n junction by diffusing impurities in the epitaxial layer 23. In FIG. 4 there is shown a combination of an electrode 22, diffusion preventing films for the diffusion, and an emission area 25 for each recording picture element, the emission area being partitioned by the diffusion preventing film 24. For a light-emitting diode having a, e.g., IR and G light, output that is, producing an output at a wavelength of 60 nm or greater, GaAs crystal is normally used, whereas GaP crystal is generally employed to generate Y light with a wavelength of 600 nm or less. Although GaAs monocrystal is opaque and therefore not permeable to light of any color GaP monocrystal is transparent to Y color light.

Therefore, in the case of alight source formed with an arrays of light-emitting diodes having Y light-emitting parts, crosstalk occurs between the adjoining luminous areas due to the electrode 22 and the boundary layer as shown in FIG. 5. It thus poses a serious problem to use such a light source to scan an record a wide-gradation, high quality color image. D1 in FIG. 5 represents a dot emitting light on receiving a signal, whereas D2 represents a dot receiving no signal. Crosstalk allows light to leak from the dot D1 to the dot D2.

SUMMARY OF THE INVENTION

In view of the shortcomings and problems, an object of the present invention is to provide a compact and inexpensive image recorder designed to make the recording time short by disposing three light-emitting elements set in array for effecting trichromatic exposure to a color photosensitive material corresponding to the spectral sensitivity characteristics of the color photosensitive material.

Another object of the present invention is to provide an image recorder designed to minimize the space needed for an exposure section by employing a plurality of recording heads.

Still another object of the present invention is to provide an image recorder capable of recording a widegradation, high-quality color image by preventing the occurrence of light crosstalk between recording picture elements.

The present invention is broadly concerned with an image recorder, and the above and other objects, thereof are accomplished by providing an image recorder comprising conveyer means for conveying a color photosensitive material; a linear array of three light-emitting elements emitting light in different luminous wavelengths, respectively arranged in a direction perpendicular to a direction in which the color photosensitive material is conveyed; and control means for controlling the conveyer means and the light emitting element array.

In the present invention, there is arranged a linear array of three light-emitting elements emitting light in different luminous wavelengths in a direction perpendicular to a direction in which the color photosensitive material is conveyed. An image is recorded continuously at high speed without a moving mechanism. With this arrangement of the linear array of three light-emitting elements, moving parts for color image recording, can be dispensed with which makes the image recorder according to the present invention not only simple in construction and but also less costly.

The objects, of the invention are further accomplished by providing an image recorder comprising conveyer means for conveying a color photosensitive material; a serial head having a linear array of three light-emitting elements for emitting light in different luminous wavelengths, respectively arranged in a direction parallel to a direction in which the color photosensitive material is conveyed (subscanning direction); a scanning mechanism for moving the serial head in a direction perpendicular to the subscanning direction (main scanning direction); and control means for controlling the conveyer means, the scanning mechanism and the light-emitting element array.

That is, in accordance with the present invention, there is provided a serial head having a linear arrays of three light-emitting elements for emitting light in different luminous wavelengths, respectively arranged in a direction parallel to a direction in which the color photosensitive material is conveyed (subscanning direction), with which an image is accurately recorded at high speed with an arrangement which is less costly. Since the serial head is composed of a linear array of three light-emitting elements emitting light in different luminous wavelengths, it is unnecessary to use a light-emitting element array of continuous length or a series of short light-emitting arrays to cover the image recording area in the main scanning direction. Moreover, since only a sectional light-emitting element array is needed, a high-quality, uniform light-emitting element arrays can be utilized to prevent density variations because of luminous variations and to prevent rib variations because of the connection of elements in continuous lengths.

Still further, the present invention provides an image recorder for recording a color image on a recording material with a plurality of recording heads each provided with light-emitting element arrays on a flat plate support. The light-emitting element array is provided along the edge face of the flat plate support by arranging the edge faces thereof opposite to each other, or by overlapping the plurality of recording heads to prevent the light-emitting element arrays from being superposed, or otherwise by arranging the plurality of recording heads along the recording material conveyance path in an arcuate or radial form.

In the present invention, the recording head is provided as a linear light-emitting element array at one end of the flat plate support, and, by disposing the ends thereof face-to-face or radially or otherwise by overlapping them, a compact space-saving image recorder is obtained.

The objects of the present invention are further attained by a recording head structure for recording an image in which a light-emitting element array is disposed on the edge face of a flat plate support, a driver is installed on the surface of the support, and means for electrically connecting the light-emitting element arrays and the driver is provided.

In accordance with this aspect of the present invention, a flat plate recording head structure is made possible by providing a linear arrays of light-emitting diodes on the edge face of each flat plate support; providing a driver circuit on the surface of the support; and electrically connecting the light-emitting element array to the driver by wire wrapping or wire bonding.

In other words, in the present invention, the flat plate recording head structure is realized by providing a linear array of light-emitting elements such as light-emitting diodes on the flat plate support and electrically connecting the drivers therebetween by bonding or by a combination of circuit patterns so that a flat plate recording head structure is realized.

The present invention is concerned also with a recording head structure for recording an image including a linear arrays of light-emitting elements disposed along the end of a flat plate support and a focusing optical element array inclined or shifted with respect to the optical element array inclined or shifted with respect to the optical axis of the light-emitting element array.

That is, according to this aspect of the present invention, there is provided as a recording head a linear array of light-emitting elements such as light-emitting diodes arranged along the end of a flat plate support. Simultaneously, there is provided a focusing optical element array inclined with respect to the optical axis of the light-emitting element array or having an optical axis shifted parallel to the optical axis of the light-emitting element array to thus provide a plurality of recording heads that can be efficiently disposed in a small area.

The objects of the present invention are yet further attained with an image recording head having a number of light-emitting elements linearly arranged as a light source for recording an image in which the centers of the luminous area of each of the light-emitting elements are spaced apart by at least more than one recording picture element pitch. In accordance with this aspect of the present invention, the influence of light crosstalk on the adjoining picture elements is thus prevented.

DESCRIPTION OF THE PREFERRED EMBODIMENTS

Figure 1:
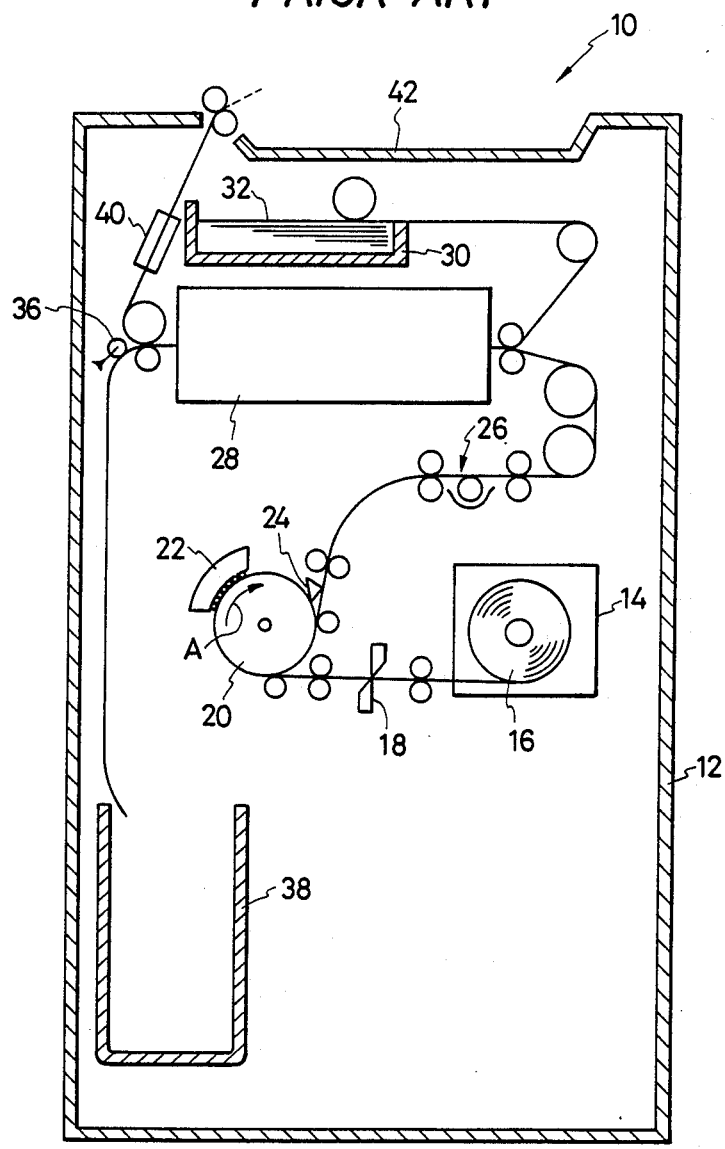
FIG. 1 is a diagram showing an example of a recorder using a conventional heat development photosensitive material.
Figure 2:
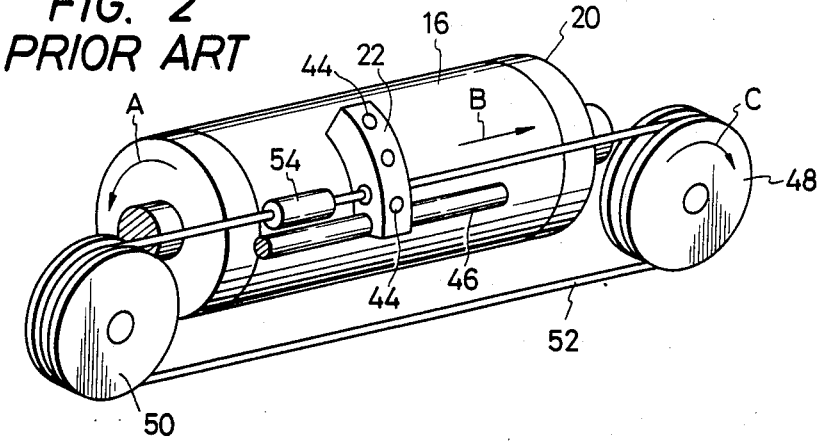
FIG. 2 is a diagram showing the construction of an exposure section.
Figure 3:
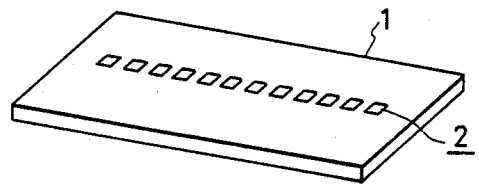
FIG. 3 is a diagram showing an example of a conventional recorder.
Figure 4:
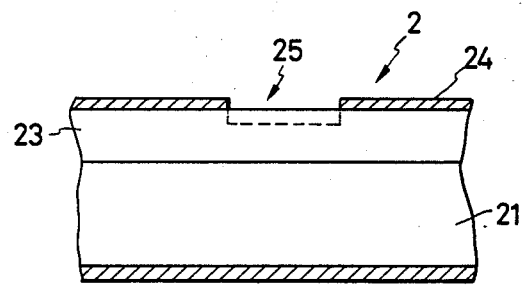
FIG. 4 is a sectional structural diagram of the recorder of FIG. 3.
Figure 5:
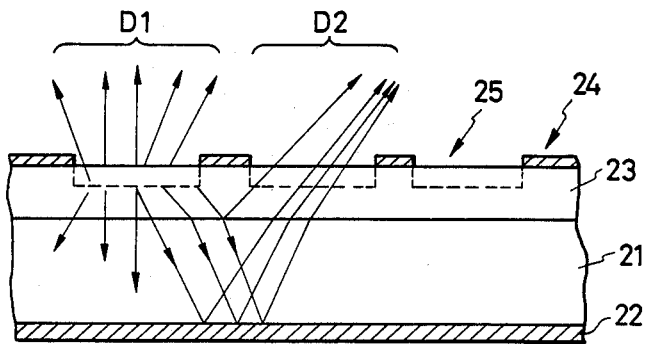
FIG. 5 is a diagram illustrating optical crosstalk.
Figure 6:
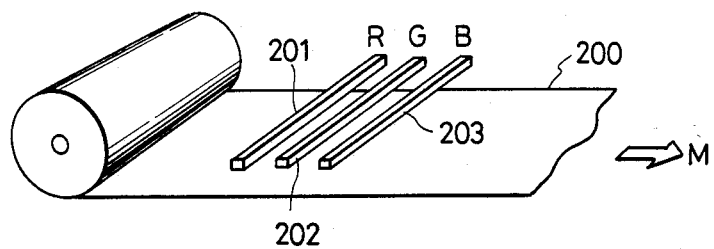
FIG. 6 is a schematic illustration of a preferred embodiment of an image recorder of the present invention.

FIG. 6 is a schematic view of a preferred embodiment of an image recorder of the present invention, wherein a color photosensitive material 200 is conveyed in direction of an arrow M while an image is recorded. Linear arrays of light-emitting diodes 201, 202, 203 (producing the three primary colors RGB is this example) emitting light in different luminous wavelengths in a direction intersecting the direction in which the color photosensitive material 200 is conveyed are provided opposite the material 200. A control unit (not shown) is provided to control the movement of the color photosensitive material 200 and the output intensities of the arrays of light-emitting diodes 201-203, whereby a color image is recorded on the color photosensitive material 200. In this case, each of the arrays of light-emitting diodes 201-203 is linear in construction. A color recorded on the color photosensitive material 200 by controlling the output intensities of the three primary colors RGB as the material 200 is conveyed. Each of the arrays of light-emitting diodes 201-203 is composed of a plurality of one-dot light-emitting diodes arranged in a line to thus carry out recording with a corresponding color image signal at the same position on the color photosensitive material 200. For this purpose, the interval between the arrays of light-emitting diodes 201 and 202 and the interval between the arrays of light-emitting diodes 202 and 203 should be an integer times (including 0) one dot pitch.

As the color photosensitive material 200 for use according to the present invention, any material is usable as long as it has at least three spectral sensitivities. For instance, a positive or negative color photosensitive material having three RGB color spectral sensitivities may be used. In addition, use can be made of an infrared color film having sensitivities effective in areas of green, red and infrared. As the color photosensitive material 200 for use according to the present invention, moreover, a heat development color photosensitive material or color photosensitive material having pressure photosensitive properties is also usable. As a heat development photosensitive material, the material disclosed, for instance, in commonly assigned Japanese Patent Application (OPI) No. 179840/82 may be employed. This material is a diffusion transfer type heat development photosensitive material containing a coloring matter doner substance which discharges diffusing coloring matter at the time of heat development. Its base contains at least photosensitive halogenated silver, an organic silver salt oxidizing agent, a hydrophobic binder, a coloring matter discharging auxiliary, and a reducing coloring matter doner substance discharging diffusing coloring matter. As a color photosensitive material having pressure-sensitive and photosensitive properties, a material of the type disclosed in commonly assigned Japanese Patent Application (OPI) No. 179836/82 may be employed, wherein a visible obtained by hardening a polymerizable compound in the form of an image through exposure to light and then applying pressure thereto. This material is such that its base carries a synthetic high polymer resin wall microcapsules containing a vinyl compound, a photopolymerization initiator and a precursor.

It is also possible to employ a material of the type disclosed in commonly assigned Japanese Patent Application (OPI) No. 278849/86 or No. 209444/87 in which a visible image is obtained by exposing to light a material containing halogenated silver, developing the halogenated silver through heat development, simultaneously hardening a polymerizable compound corresponding to the developed regions, and then applying pressure to the resulting product. The material disclosed in Japanese Patent Application (OPI) No. 278849/86 provides an image on an image receiving material by transferring a color image forming substance to the image receiving material having an image receiving layer after heat development. In this case, at least a photosensitive halogenated compound, a reducer a polymerizable substance and the color image forming substance are laid on the base, and at the same time at least the polymerizable substance and the color image forming substance and encapsulated in the same microcapsules. In the case of the material disclosed in Japanese Patent Application (OPI) No. 209444/87, an image is obtained without employing an image receiving material. Specifically, halogenated silver, a reducer, a polymerizable compound and two substances producing coloring reactions in a contact state are employed, one of the substances producing the coloring reaction and the polymerizable substance are encapsulated in microcapsules. Moreover, the base carries a photosensitive layer wherein the other substance producing the coloring reaction is present outside the microcapsules containing the polymerizable compound.

Figure 7:
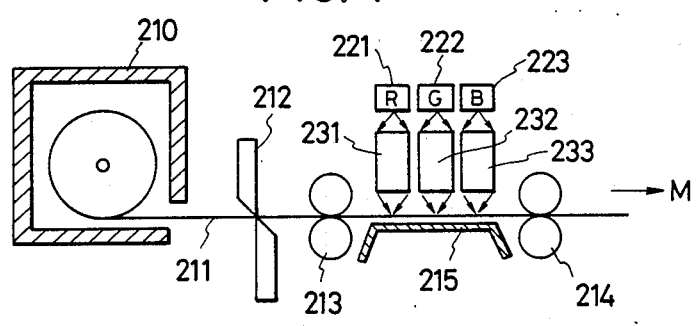
FIG. 7 is a schematic illustration of another embodiment of the present invention.

FIG. 7 is a schemative view of another embodiment of the present invention, wherein a color photosensitive material 211 in rolls contained in a magazine 210 is drawn out and conveyed by conveyer rollers 213, 214 in a direction M and cut by a cutter 312 in predetermined lengths before being sent to a recording unit. The recording unit is equipped with a guide plate 215 for flattening the recording surface of the color photosensitive material 211, and linear arrays of light-emitting diodes 221, 222, 223 for emitting trichromatic RGB light are installed thereabove. The rays of light emitted by the arrays of light-emitting diodes 221, 222, 223 are focused via respective arrays of Selfoc lenses 231, 232, 233 onto the recording surface ("Selfoc" is a trade name of Nippon Sheet Glass Co., Ltd., and a Selfoc lens is a lens of the refractive index distribution type). As in the case of FIG. 6, the arrays of light-emitting diodes 221-223 are set in rows, and the arrays of Selfoc lenses 231-233 are also set in rows, whereby color images are continuously recorded on the color photosensitive material 211 while the latter is conveyed at a predetermined speed. THe interval between the arrays of light-emitting diodes 221, 222, 223 is set at an integer times (including 0) one dot pitch on the surface of the color photosensitive material 211.

Figure 8A:
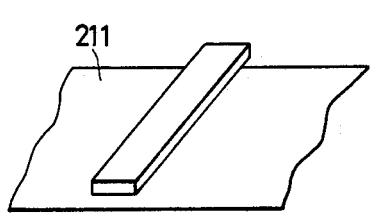
FIGS. 8A to 8C show examples of image forming optical systems according to the present invention.
Figure 8B:
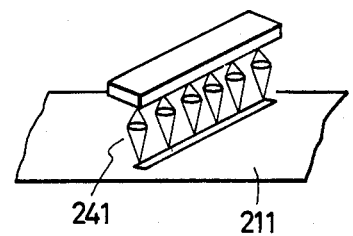
Figure 8C:
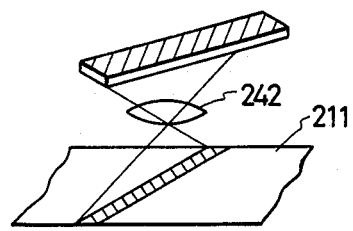

As shown in 8A, the arrays of light-emitting diodes 221-223 may be placed directly against the color photosensitive material 211 for recording purposes, instead of employing the Selfoc lenses 231-223 as shown in FIG. 7. Also, further arrays of micro lenses 241 may be used, as shown in FIG. 8B as shown in FIG. 8C, moreover, it is possible to use one lens unit 242 to form the image. In FIGS. 8A-8C, the optical system is intended to provide one-color recording.

Figure 9:
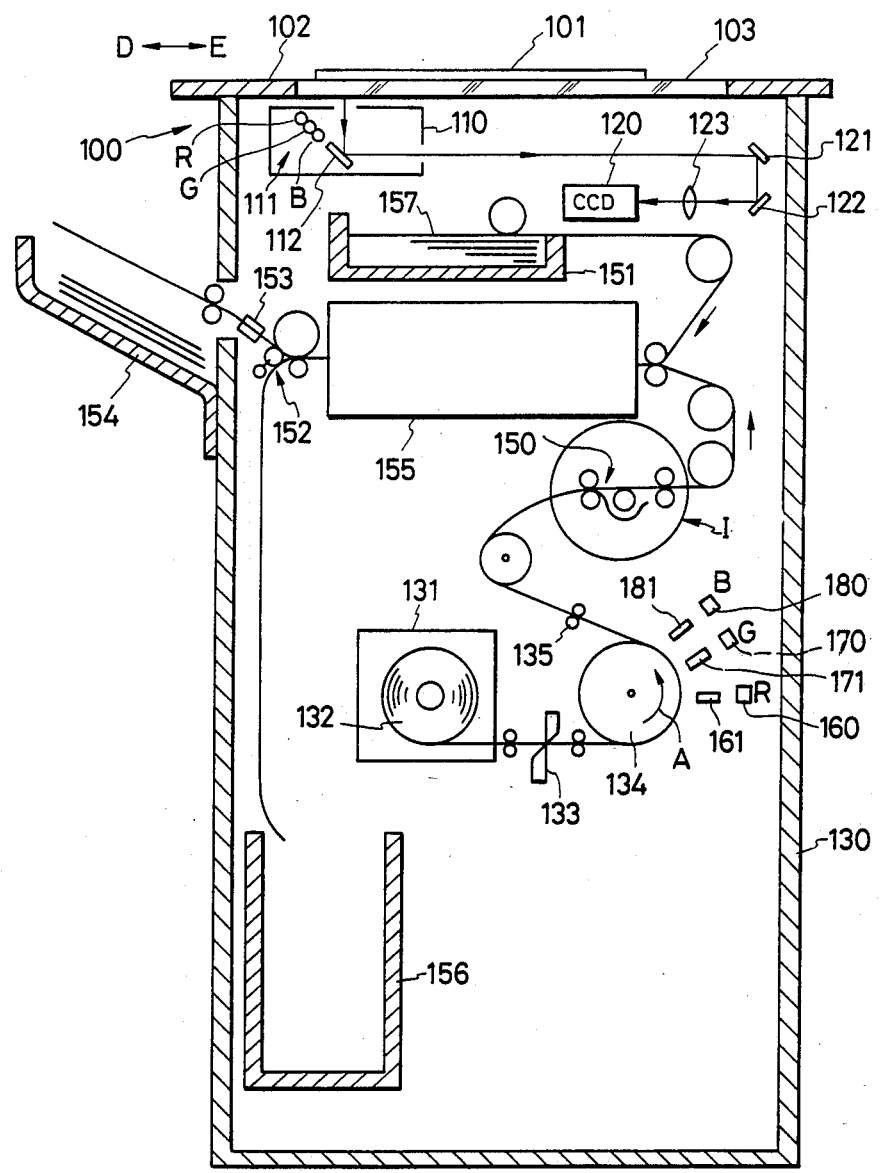
FIG. 9 is a diagram showing a recorder using a heat development photosensitive material embodying the present invention.

Referring to FIG. 9, a detailed description will subsequently be given of the application of the color image recorder embodying the present invention to recording on a heat development photosensitive material.

As image recorder is equipped with a magazine 131 mounted in a recorder body 130, the magazine 131 containing a heat development photosensitive material 132. The heat development photosensitive material 132 within the magazine 131 is drawn out and cut by a cutter 133 in predetermined lengths and, as an exposure drum 134 turns, sent to a recording unit where linear arrays of light-emitting diodes 160 (R), 170 (G) and 180 (B) are arranged. The heat development photosensitive material 132 after being exposed to light is sent to a conveyer unit 135 and sent via a water coater 150 to a developing transfer unit 155. There are also provided liner arrays of Selfoc lenses 161, 171, 181 between the arrays of light-emitting diodes 160, 170, 180 in the recording unit and the exposure drum 134 with the same interval relation as described above with respect to dot pitch.

An image receiving material 157 contained in a tray 151 is sent to the developing transfer unit 155 where it is superposed on the heat development photosensitive material 132 before being heated by a heater in the developing transfer unit 155. The heat development photosensitive material 132 is there developed, and the image thus developed is transferred to the image receiving material 157. After the completion of transfer the heat development photosensitive material 132 is discharged via a peeler 152 into a waste tray 156, whereas the image receiving material 157 is sent via a dryer 153 into a discharge tray 154 installed on the side.

An image reader 100 for scanning and reading an image of a set original 101 is installed on top of the image recorder, the original 101 being mounted on a glass plate 103 of a movable original plate 102 so that the original 101 is scanned in direction of D and E in FIG. 9. A light source 110 for producing light in the three primary colors and directing the light onto the original 101 and receiving the reflected light is arranged under the glass plate 103. The light source 110 is fitted with a lamp 111 emitting the three primary colors of light to illuminate the original 101 and a mirror 112 receiving and reflecting the light reflected from the original 101. The light reflected from the mirror 112 in the light source 110 is reflected from mirror 121 and 122 and formed by a lens 123 into an image, which is then received by an image reading element 120 such as a CCD. Each of the image signals of RGB derived from the original 101 and read by the image reading element 120 is subjected to predetermined image processing, and the resulting signals sent to the arrays of light-emitting diodes 160, 170, 180. Arrays of Selfoc lenses 161, 171 and 181 as image forming optical systems corresponding to the linear arrays of light-emitting diodes 160, 170 and 180 are provided in the recording unit of the exposure drum 134. THe image light emitted from the arrays of light-emitting diodes 160-180 is formed via the arrays of Selfoc lenses 161-181 into an image on the surface of the color photosensitive material 132 conveyed along the exposure drum 134.

With the aforediscribed arrangement, the heat development photosensitive material 132 on the exposure drum 134 is exposed to an image by the image forming light from the arrays of light-emitting diodes 160-180 emitting light in the three primary colors RGB and the Selfoc lenses 161-181. The image thus exposed on the heat development photosensitive material 132 is transferred by the developing transfer unit 155 to the image receiving material 157 before being outputted.

Although reference has been made by way of example to the use of arrays of light-emitting diodes as the light-emitting elements in the above embodiment, arrays of laser diodes may be used instead. Moreover, two arrays of light-emitting diodes may be used for recording purposes, whereas an array of light-emitting diodes may be used to record a monochromatic image. Further, color dots from the arrays of light-emitting elements may be subjected simultaneously or sequentially after being divided into blocks to pulse width modulation or luminous intensity modulation according to image signals. Although reference has been made by way example to three colors RGB, no difficulty occurs as long as the proper relation of wavelengths of the three colors to the photosensitive material is maintained. For instance, for heat development photosensitive material, Y and R and infrared light may be employed.

As set forth above, since the linear arrays of light-emitting diodes emitting light in different luminous wavelengths are installed above the color photosensitive material in the image recorder according to the present invention, the recording time is shortened with the advantage that the number of recording sheets processed per unit time can be increased. Moreover, the manufacturing cost of the apparatus is reduced. Not only is recording stability improved, but also the mechanical durability increased as moving parts can be dispensed with.

Figure 10:
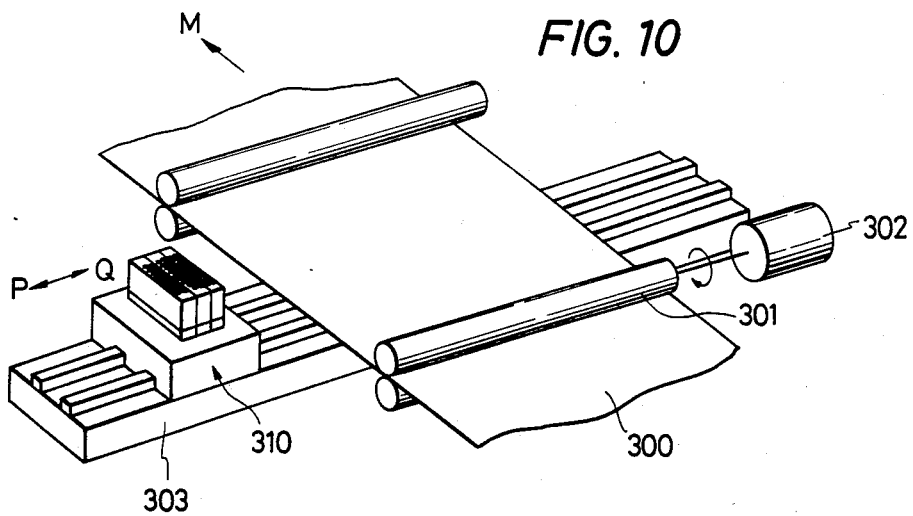
FIG. 10 is a schematic diagram showing another embodiment of an image recorder of the present invention.
Figure 11:
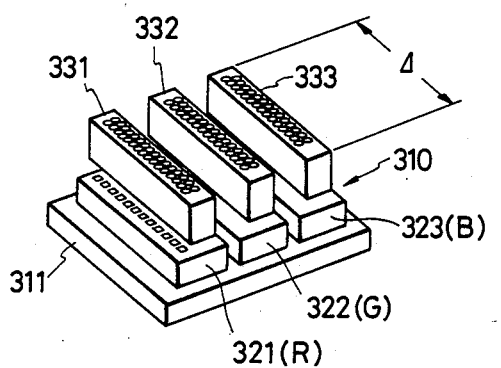
FIG. 11 is a schematic diagram showing the detailed structure of a serial head shown in FIG. 10.

FIG. 10 is a schematic view of still another embodiment of the present invention, wherein the color photosensitive material 300 is conveyed by a conveyer roller 301 and a conveyer motor 302 in the direction of an arrow M (subscanning direction) at the time of image recording and a linear survomotor 303 is arranged in a direction perpendicular to the direction M in which the material is conveyed. A serial head 310 moving in directions P and Q (main scanning direction) is installed above the linear survomotor 303. As shown in FIG. 11, the serial head 310 has a base 311 electromagnetically connected to the linear servomotor 303 and the base is fitted with linear ($\Delta$ in length) arrays of light-emitting diodes 321, 322 and 323 individually emitting trichromatic RGB light and linear arrays of Selfoc lenses 331, 323 and 333 corresponding to the respective arrays of light-emitting diodes 321-323. Rays of image light emitted by the arrays of light emitting diodes 321-323 are formed via the arrays of Selfoc lenses 331-333 into an image on the color photosensitive material 300.

Figure 12:
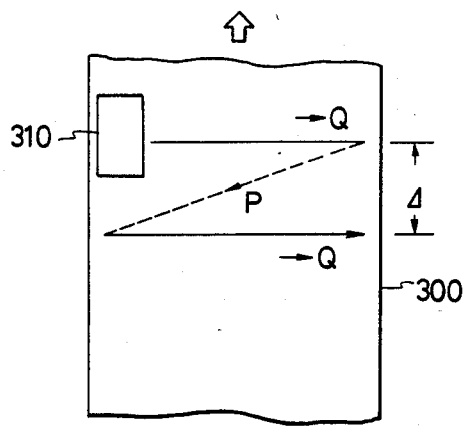
FIGS. 12, 13A and 13B are diagrams descriptive of the operation of the serial head of FIG. 11.
Figure 13:
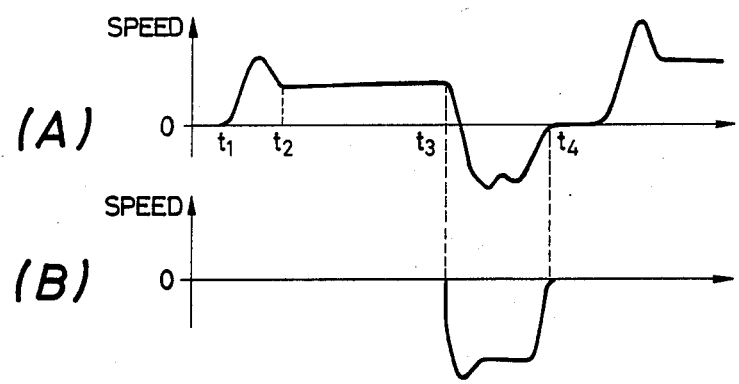

An image signal is applied to the arrays of light-emitting diodes in a state as shown in FIGS. 10 and 11 to cause them to emit light, while simultaneously the serial head 310 is moved by the linear servomotor 303 in direction Q to effect recording of a color image having a length equivalent to the line length $\Delta$ of each of the arrays of light-emitting diodes 321-323 on the color photosensitive material 300. FIG. 13A shows a main scanning curve, wherein a time period $t_1$ to $t_2$ is employed for recording preparation and image recording implemented during $t_2$ to $t_3$. After recording during main scanning as shown in FIG. 12, the linear servomotor 303 is reversely operated to move the serial heat 310 back in direction P ($t_3$ to $t_4$), and the conveyor motor 302 is driven to convey the color photosensitive material 300 by the line length $\Delta$ in direction M so as to implement subscanning (see FIG. 13B). Thereafter, main scanning recording is carried out. By alternately repeating main scanning and subscanning, a color image can be recorded on the color photosensitive material 300.

The arrays of light-emitting diodes 301-303 for emitting three-color RGB light are composed of a plurality of light-emitting diodes arranged in rows on a dot basis. Therefore, recording with image signals int he same positions on the color photosensitive material 300 is effected. Consequently, the intervals between the arrays of light-emitting diodes 301 and 302 and between those of light-emitting diodes 301, 303 must be an integer multiple (including 0) of the one-dot diameter. If maintenance of surface smoothness of the color photosensitive material 300 is required during image recording, a planar holding plate or other mechanism for maintaining a planar state may be provided on the back surface of the color photosensitive material 300.

For the color photosensitive material 300 employed in this embodiment, a material of any type is usable as far as it has at least three different spectral sensitivities as in the case of preceeding embodiments.

Figure 14:
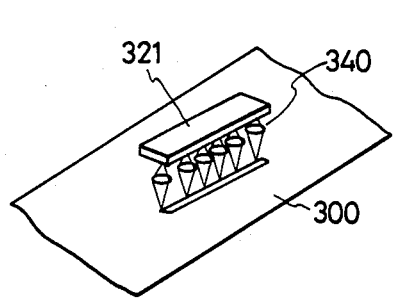
FIGS. 14 and 15 are diagrams showing other examples of the serial head of FIG. 11.
Figure 15:
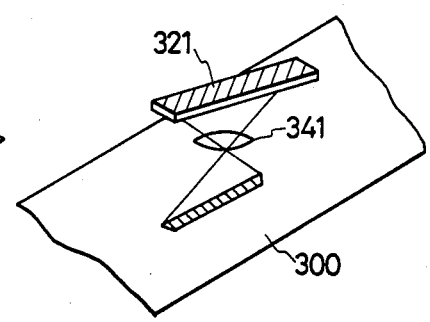

Although reference has been made by way of example to the use of arrays of Selfoc lenses 331-323 as image forming optical systems for the arrays of light-emitting diodes 321-323 as shown in FIGS. 10 and 11, the latter may be placed directly adjacent the color photosensitive material 300 for recording. As shown in FIG. 14, on the other hand, arrays of micro lenses 340 can also be used, or a signal lens unit 341 may be employed, as shown in FIG. 15, to form the image. FIGS. 14 and 15 show an optical system intended for monochromatic recording.

Figure 16:
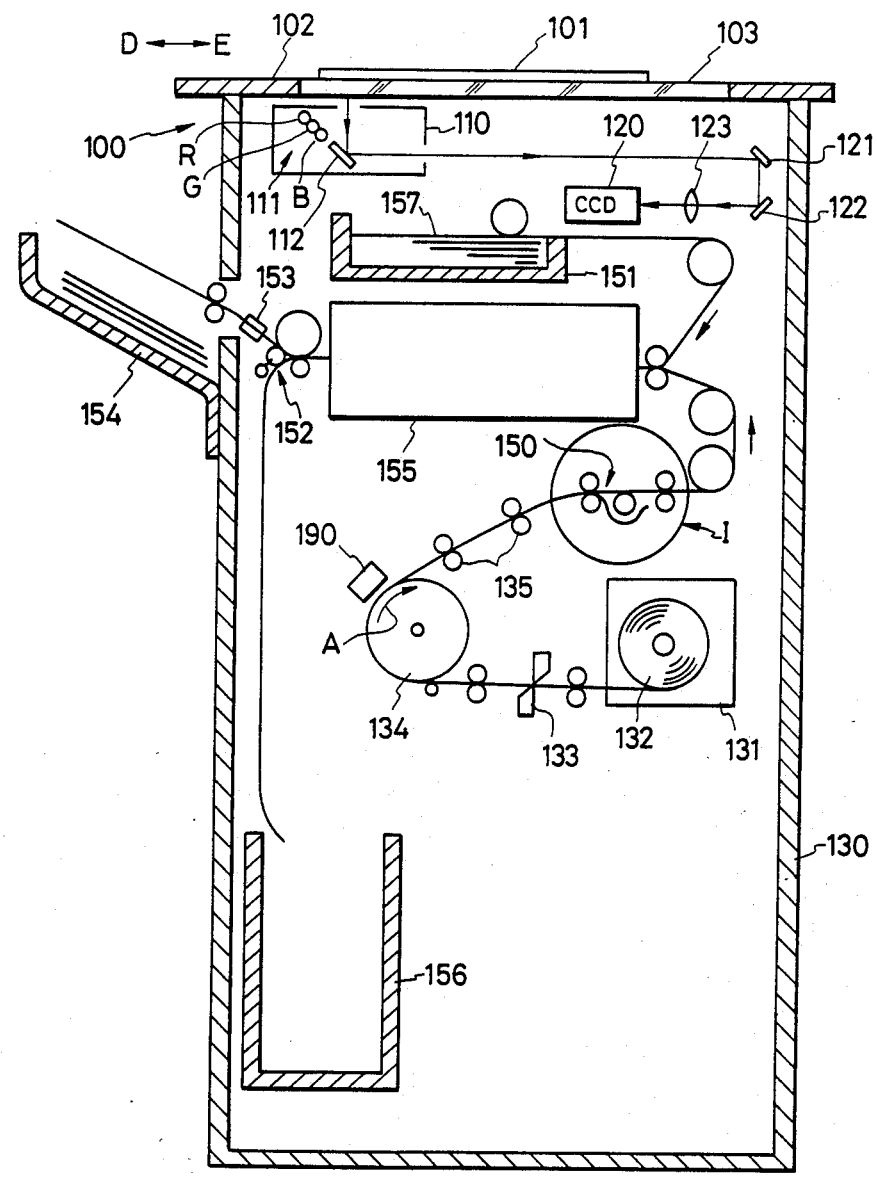
FIG. 16 is a diagram showing a recorder using another heat development photosensitive material embodying the present invention.

Referring to FIG. 16, a detailed description will be given of the application of the color image recorder of FIG. 9 to recording an image on a heat development photosensitive material. In FIG. 16, elements, the same as those employed in FIG. 9 are indicated by like reference numerals.

As image recorder is equipped with the magazine 131 mounted in the recorder body 130, the magazine 131 containing the heat development photosensitive material 132. The heat development photosensitive material 132 within the magazine 131 is drawn out and cut by the cutter 133 in predetermined lengths and, as the exposure drum 134 turns, sent to the recording unit where the serial head 160 is installed. The heat development photosensitive material 132 exposed to light is sent to the conveyer unit 135 and sent via the water coater 150 to the developing transfer unit 155.

The image receiving material 157 contained in the tray 151 is sent to the developing transfer unit 155 where it is superposed on the heat development photosensitive material 132 before being heated by the heater in the developing transfer unit 155. The heat development photosensitive material 132 is thus developed, and the developed image is transferred to the image receiving material 157. After the completion of transfer, the heat development photosensitive material 132 is discharged via the peeler 152 into the waste tray 156, whereas the image receiving material 157 is sent via the dryer 153 into the discharge tray 154 installed on the side.

The image reader 100 for scanning and reading an image of the original 101 is installed on top of the image recorder. The original 101 is mounted on the glass plate 103 of the movable original plate 102 so as to be scanned in directions, D and E in FIG. 16. The light source 110 for directing light in the three primary colors RGB on the original 101 and receiving the reflected light is arranged under the glass plate 103. The light source 110 is fitted with the lamp 111 emitting the RGB light to illuminate the original 101 and the mirror 112 receiving and reflecting the light reflected from the original 101. The light reflected from the mirror 112 in the light source 110 is reflected from mirror 121 and 122 and formed by the lens 123 into an image, which is then received by the image reading element 120 such as a CCD. EAch of the RGB image signals derived from the original 101 and read by the image reading element 120 is subjected to image processing and applied to the arrays of light-emitting diodes of the serial head 190.

The serial head 190 is installed int he recording unit and the arrays of Selfoc lenses acting as image forming optical systems corresponding to the linear arrays of light-emitting diodes are provided int he serial head 190. The image light emitted from the arrays of light-emitting diodes is formed via the arrays of Selfoc lenses into an image on the surface of the color photosensitive material 132 conveyed along the exposure drum 134.

With this arrangement, the heat development photosensitive material 132 on the exposure drum 134 is exposed to an image by means of the image forming light from the arrays of light-emitting diodes and the Selfoc lenses. As main scanning and subscanning are repeated, the image thus exposed on the heat development photosensitive material 132 is transferred by the developing transfer unit 115 to the image receiving material 157 before being outputted.

Although reference has been made, by way of example, to the use of the arrays of light-emitting diodes as the light-emitting element in the above embodiment, arrays of laser diodes may be used instead. Moreover, an arrays of light-emitting diodes may be used to record a monochromatic image. Further, color dots from the arrays of light-emitting elements may be subjected simultaneously or sequentially after being divided into blocks to pulse width modulation or luminous intensity modulation according to image signals.

As set forth above, since the three liner arrays of light-emitting diodes emitting light in different luminous wavelengths are installed above the color photosensitive material int he image recorder according to this embodiment of the present invention, the total recording time is shortened, with the resulting advantage that the number of recording sheets which can be processed per unit time can be increased. Moreover, the manufacturing cost of the apparatus can be reduced as it is simple in construction with the effect of making it possible to record a high-quality image with relatively short arrays of light-emitting elements.

Figure 17:
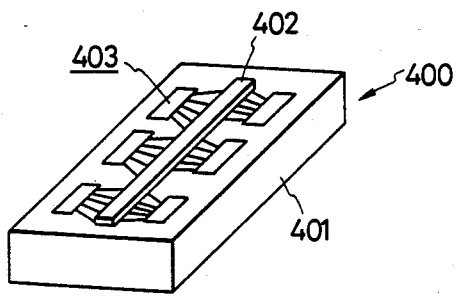
FIG. 17 is an external view of a recording head for general use.

Subsequently, another embodiment of a recording heat for use in the present invention will be described. When an image is recorded on a photosensitive material by means of a recording head having arrays of light-emitting elements such as light-emitting diodes, the recording head 400 may be arranged as shown in FIG. 17, where linear arrays of light-emitting diodes 402 are provided at the center of the surface of the flat plate base 401. Drivers 403 for driving the respective diodes are installed on both sides thereof.

Figure 18:
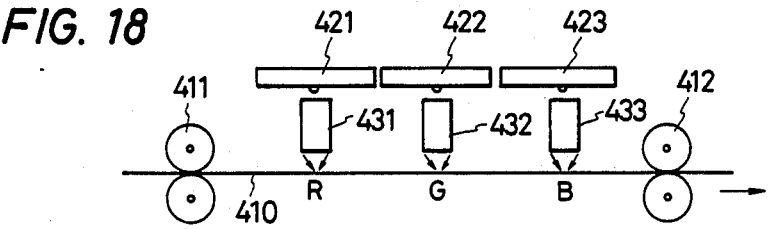
FIG. 18 is a constructional view of a recording section using the recording head of FIG. 17.

Accordingly, when a plurality of such recording heads 400 are used to record a color image with the emission of light of there colors, e.g., RGB, it is difficult to place each array of the light-emitting diodes close to the photosensitive material. Therefore, generally the recording heads 421-423 must be arranged in parallel for recording purposes, as shown in FIG. 18. In FIG. 18, the color photosensitive material 410 is conveyed by the conveyer rollers 411 and 412 while the arrays of light-emitting elements of the recording heads 412-423 arranged in the recording unit are caused to emit light, whereby images are recorded on the color photosensitive material 410 via the arrays of Selfoc lenses 431-433.

When a color image is thus recorded with the recording head shown in FIG. 17, the plurality of parallel flat plate recording heads have to be provided, which inevitably makes the recorder large in size.

Figure 19:
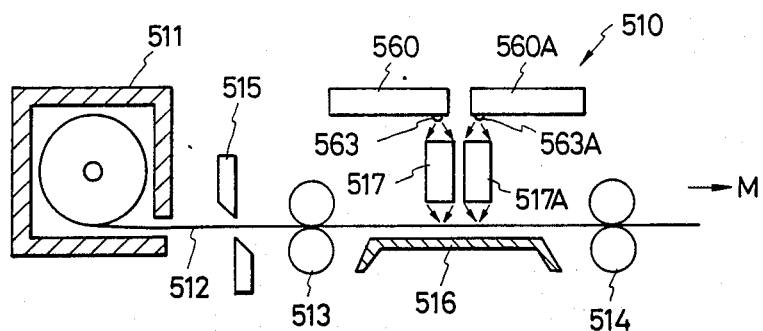
FIGS. 19, 20, 21, 22, 23 and 24 show still further embodiments of image recorders of the present invention.

FIG. 19 shows an example of the construction of another embodiment of an image recorder 510 according to the present invention, wherein photosensitive material 512 from rolls contained in a magazine 511 is drawn out and conveyed by the conveyer rollers 513 and 514 in direction M and cut by the cutter 515 in predetermined lengths before being sent to the recording unit. The guide plate 516 for smoothing the recording surface of the photosensitive material 512 is installed in the recording unit between the conveyer rollers 513 and 514. The side edge faces of two of the linear arrays of luminescent recording heads 560 and 560A are located opposite the guide plate 516. Moreover, the arrays of Selfoc lenses 517 and 517A acting as image forming optical systems are provided between the respective recording heads 560 and 560A and the photosensitive material 512. The image light is applied from the arrays of light-emitting diodes 563 and 563A of the recording heads 560 and 560A via the arrays of Selfoc lenses 517 and 517A to the surface of the photosensitive material 512 in the direction of an arrow so that the image is formed thereon. In this case, the wavelengths of the rays of light emitted form the light-emitting diodes 563 and 563A are different from each other, and the photosensitive materials 512 is differently colored so as to record a color image.

Figure 25:
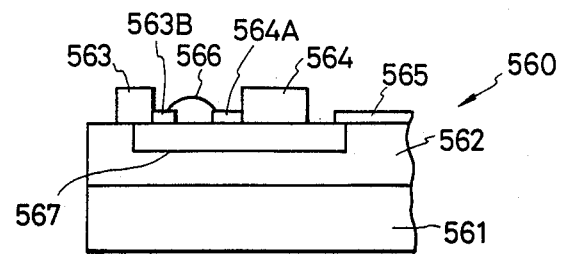
FIGS. 25, 26, 27, 28 and 29 are structural views of recording heads for use in the present invention.

Referring to FIG. 25, a structural example of the aforesaid recording head 560 (560A) will be described.

A layer of printed circuit board 562 is laid on the surface of the flat plate base 561 with the linear array of light-emitting diodes 563 installed along the side end of the surface thereof. In addition, the driver 564 is fastened to the surface of the printed circuit board 562 along the array of light-emitting diodes 563, and a layer of common electrode 565 is arranged thereon. Each electrode 563B of the array of light-emitting diodes 563 and each electrode 564A of the driver 564 are connected by wire bonding 566, whereas the array of light-emitting diodes 563 is connected via an electrode layer 567 provided in the printed circuit board 562 to the common electrode 565.

With this arrangement where the array of light-emitting diodes 563 is installed along the side edge face of the surface of the flat plate base 561, a compact image recorder 510 with the recording unit contained in a small space can readily be constructed.

Figure 20:
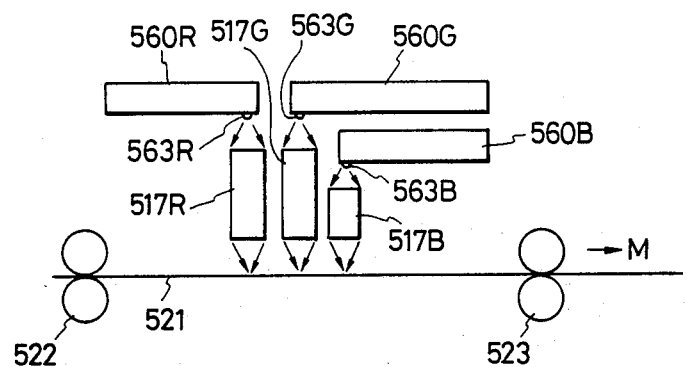

FIG. 20 is a diagram showing another recording unit for an image recorder according to the present invention wherein recording heads for emitting three-color RGB light are installed between the conveyer rollers 522 and 523 for conveying the color photosensitive material 521, namely, recording heads 560R, 560G, 560B for respectively emitting R, G and B color light. The side ends with the respective arrays of light-emitting diodes 563R, 563G of the recording heads 560R, 560G are set opposite one another, whereas the side end with the array of light-emitting diodes 563B of the recording head 560B for emitting R light is arranged in the same direction as that of the recording head 560G. Moreover, the recording head 560B is placed beneath the recording head 560G in order not to obstruct exposure by array of light-emitting diodes 563G. In this case the arrays of Selfoc lenses 517R, 517G, 517B are also installed between the color photosensitive material 521 and the recording heads 560R, 560G, 560B, respectively. The common length of the array of Selfoc lenses 517B is made shorter than those of the remaining arrays of Selfoc lenses 517R and 517G.

Figure 21:
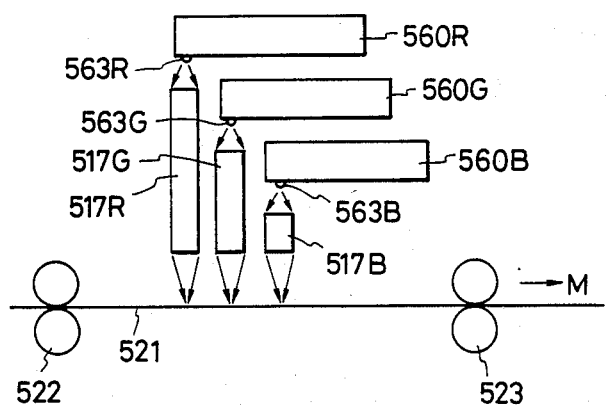

FIG. 21 is a diagram showing still another recording unit for an image recorder according to the present invention, wherein recording heads for emitting three-color RGB light are installed between the conveyer rollers 522 and 523 for conveying the color photosensitive material 521, namely, recording heads 560R, 560G and 560B for respectively emitting R, G and B color light. The side ends of the respective arrays of light-emitting diodes 563R, 563G and 563B are arranged in the same direction and they are arranged in a layer in such a manner as to not obstruct their respective exposure. In this case, the arrays of Selfoc lenses 517R, 517G and 517B are also provided between the color photosensitive material 521 and the recording heads 560R, 560G and 560B, and their common length is made greater in the upper layer, that is, the length is made greater in the order of 517B–517G–517R, which has the effect of making the apparatus more compact.

As the arrays of light-emitting diodes are mounted at one end of the flat plate, even though three recording heads 560R–560B are employed to record a color image, the space occupied by the recording unit is minimized. The position of the recording head 560B is not limited to what is shown in the example above, and it may be located beneath the other head 560R or 560G. Although the emission of three-color RGB light is used to effect recording in the above embodiment, another color light may be emitted according to the coloring characteristics of the color photosensitive material 521.

Figure 22:
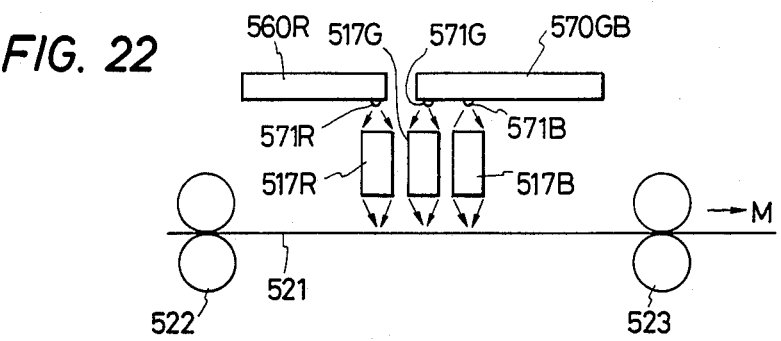
Figure 26:
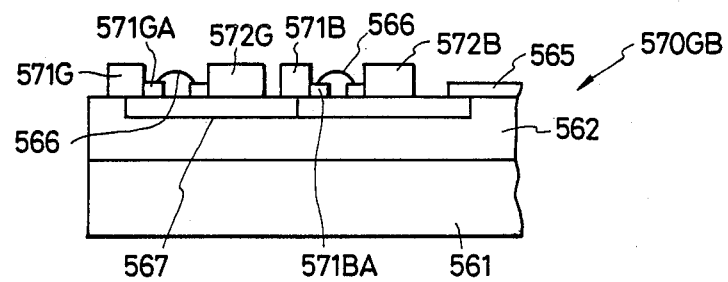

FIG. 26 shows another structural example of the recording head, wherein there are provided, at one end of the flat plate, two arrays of light-emitting diodes 571G and 571B for emitting G and B light, as in the case of the recording head 570GB, and drivers 572G, 572B for driving the arrays of light-emitting didoes 571G, 571B, whereas the recording head 560G for emitting R light is located opposite to the former combination as in the case of the recording unit for the image recorder shown in FIG. 22. As a result, the space required for accommodating the recording unit for recording the color image can be reduced. In this case, the arrays of Selfoc lenses 517R, 517G and 517B are also provided between the color photosensitive material 521 and the recording heads 560R, 570GB. The light emitted from the recording heads 570GB for emitting two-color light is not limited to G and B but may be a combination of other colors. Otherwise, three arrays of light-emitting diodes for emitting another type of light in addition to the aforementioned two types may be employed to increase the overall effectiveness.

Figure 27:
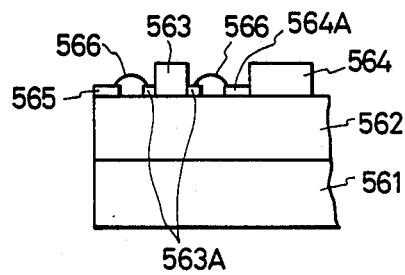
Figure 28:
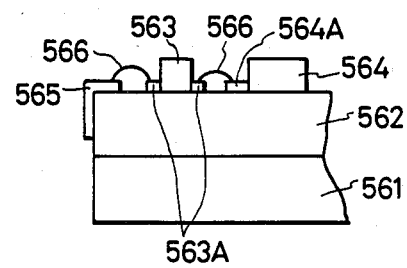
Figure 29:
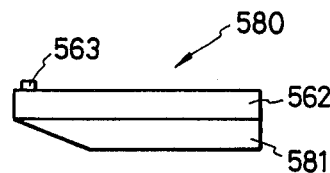

In the recording head with the arrays of light-emitting diodes installed at one end of the flat plate, the common electrode 565 may be provided at one end of the surface of the printed circuit board, as shown in FIG. 27, or the common electrode 565 may be provided in a position extending from one end to the side of the surface of the printed circuit board 562. In both cases, electrical connections can readily be accomplished because the electrodes 563A of the arrays of light-emitting diodes 563 and the common electrode 565 are located on the same plane and connected by wire bonding.

Figure 23:
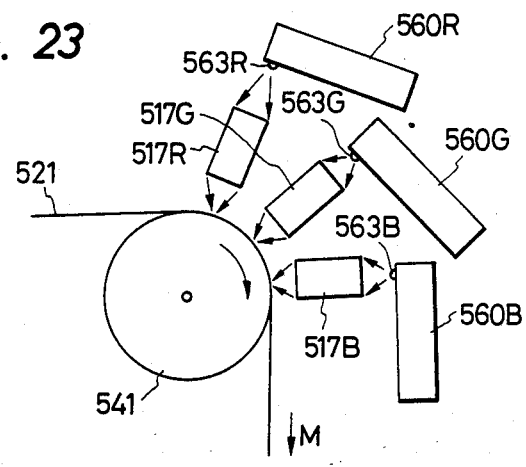

FIG. 23 is a diagram showing still another example of the recording unit of the image recorder, wherein the recording heads 560R, 560G and 560B are radially arranged along part of the roller 541 for feeding the color photosensitive material 521 for exposure. In this case, the arrays of Selfoc lenses 517R–517B are provided between the color photosensitive material 521 and the respective recording heads 560R–560B.

Figure 24:
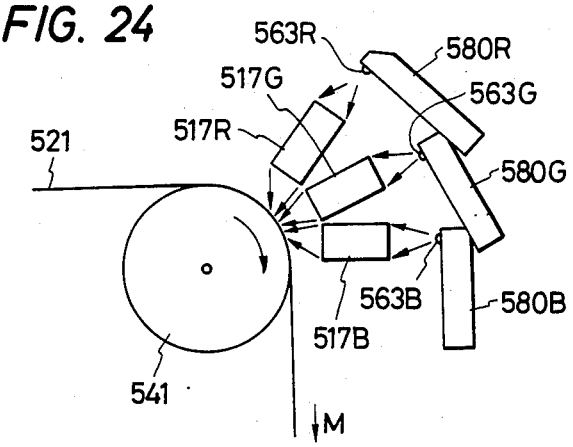

Moreover, one end portion of the surface opposite the luminescent part of the flat plate base 581 supporting the recording head 580 is diagonally cut to reduce the space required for accommodating the arcuate recording unit. In this case, the recording heads 580R–580B are radially placed in a layered arrangement as shown in FIG. 24. In this case, the same location of the color photosensitive material 521 can be exposed simultaneously, whereby image recording is readily controlled.

Arrays of Selfoc lenses are employed as an optical image forming system in the embodiments described above. However, they may placed directly in contact with the color photosensitive material, or there may be provided arrays of micro lenses or a lens unit. Moreover, the arrays of light-emitting elements may be composed of laser diodes.

As set forth above, since the arrays of light-emitting diodes of the recording heads are installed at one end in the image recorder according to the present invention, they can be arranged close to the photosensitive material, even when a plurality of parallel color images are to be recorded, with the effect of reducing the size and manufacturing cost of the apparatus. Moreover, image recording can be easily controlled because image light of more than one color can be focused on one line of the photosensitive material without difficulty.

Figure 30:
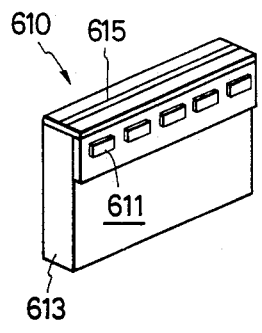
FIG. 30 is an external constructional view of another recording head of the present invention.

FIG. 30 is a diagram showing another example of a recording head 610 constructed according to the present invention, wherein linear arrays of light-emitting diodes 615 are installed on the side edge face of the flat plate base 613 and plural drivers 611 are provided on the surface of the base 613. Moreover, the arrays of light-emitting diodes 615 and the drivers 611 are electrically connected by, for instance, wire bonding.

Figure 31:
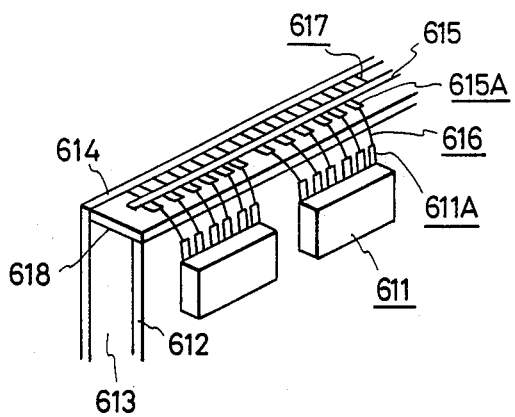
FIG. 31 is a detailed external view of FIG. 30.

FIG. 31 is a diagram showing the detailed structure of the recording head of FIG. 30, wherein a layer of printed circuit board 612 is placed on the surface of the base 613 and the drivers 611 are bonded in order to the surface thereof. Moreover, a layer of alumina substrate 618 is place on the side edge face of the base 613 and a layer of common electrode 614 is provided on the back surface (opposite side of the printed circuit board 612) of the base 613. The linear arrays of light-emitting diodes 615 are installed on the central surface of the alumina substrate 618, whereas the electrodes of the arrays of light-emitting diodes 615 and the electrodes 611A of the drivers 611 are connected by wire bonding 616. The arrays of light-emitting diodes 615 are further connected via the printed circuit board 617 to the common electrode 614.

As the recording unit is of a flat place construction, the space required for installation is small, even when the recording head is formed with a number of parallel exposing components, so that a compact recorder is produced.

Figure 32A:
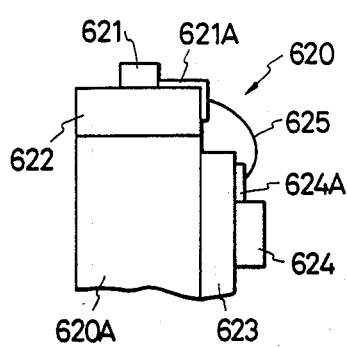
FIGS. 32A to 32C are structural views of other embodiments of the present invention.
Figure 32B:
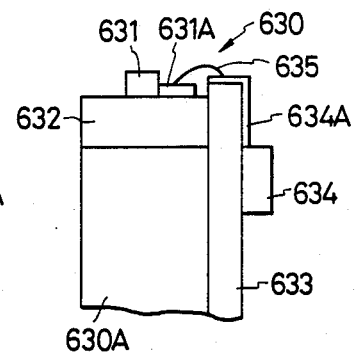
Figure 32C:
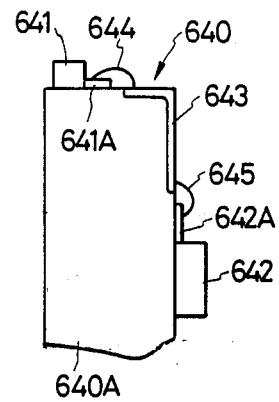

FIGS. 32A–32C are diagrams showing other embodiments of the present invention. The recording head 620 shown in FIG. 32A is arranged so that substrates 622 and 623 are installed on the side edge face and surface of the base 620A, and the linear arrays of light-emitting diodes 621 are provided in the center of the top face of the substrate 622. The drivers 624 are installed on the surface of the substrate 622, whereas the electrodes 621A of the arrays of light-emitting diodes 621 and the electrodes 624A of the drivers 624 are located on the same plane (vertical face in this drawing). Accordingly, the electrodes 621A, 624A can readily be connected by wire wrapping 625. The recording head 630 shown in FIG. 32B is arranged so that the substrate 632 is installed on the side edge face of the base 630A and the arrays of light-emitting diodes 631 are provided on the surface of the substrate, and the substrate 633 is installed on the surface of the base 630A, whereas the drivers 634 are fitted to the substrate 633. The electrodes 631A of the arrays of light-emitting diodes and the electrodes of the drivers 634 are located on the same plane (horizontal face in this drawing), and both connected by wire bonding 635. Since the contact areas are also located on the same plane in this case, electrical connections are readily accomplished. On the other hand, the recording head 640 shown in FIG. 32C is arranged so with a circuit pattern 643 is positioned on the base 640A and the electrodes 641A of the arrays of light-emitting diodes 641 and the circuit pattern 640 connected by wire bonding 644. Moreover, the drivers 642 are fitted to the surface of the base, and the electrodes 642A of the drivers 642 and the circuit pattern 643 are connected by wire bonding 645.

As shown in FIGS. 32A–32C, the recording heads 620, 630 and 640 have flat-plate base constructions, and the arrays of light-emitting diodes 621, 631 and 641 are provided on the side edge faces of the respective bases. In any case, small-sized exposing components can be formed to provide more than one color in parallel.

Figure 33:
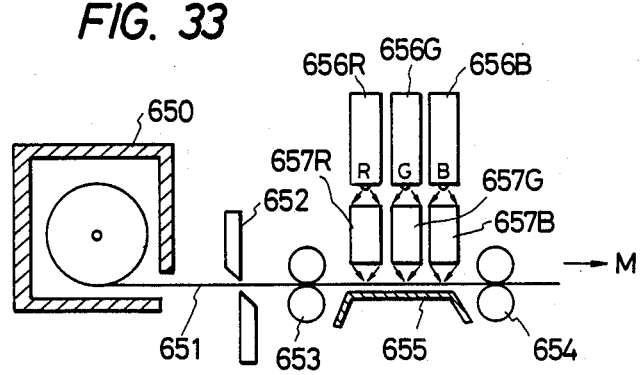
FIGS. 33 and 34 are constructional views of exposure sections using the recording head according to the present invention.

FIG. 33 is a diagram showing a structural example of the exposing components when the recording heads are applied to an image recorder according to the present invention, wherein color photosensitive material 651 from rolls contained in the magazine 650 is dawn out and conveyed by the conveyer rollers 653, 654 in the direction M and further cut by the cutter 652 in predetermined lengths before being sent to the recording unit. The recording unit is fitted with the guide plate 655 for smoothing the recording surface of the color photosensitive material 651 and the linear arrays of recording heads 656G and 656B for emitting three-recording primary-color RGB light are installed thereabove. The arrays of Selfoc lenses 657R, 657G, 657B acting as image forming optical systems are provided between the recording heads 656R–656B and the color photosensitive material 651. The image light emitted by the arrays of light-emitting diodes of the recording heads 656R–656B is sent via the arrays of Selfoc lenses 657R–657B to the surface of the color photosensitive material 651 to form an image so that a color image is recorded thereon.

The space required for the exposing components can be reduced, even when three recording heads 656R–656B are employed, because of their flat-plate construction.

Figure 34:
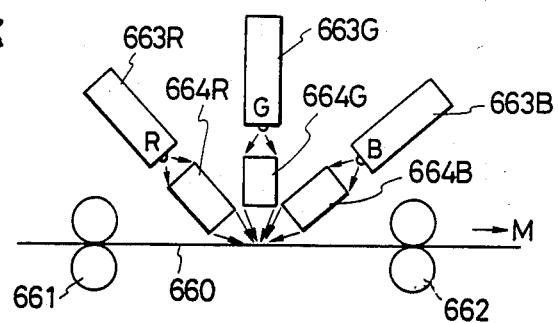

FIG. 34 is a diagram showing another example of the exposure unit of the image recorder, wherein the recording heads 663R, 663G, 663B are radially arranged in the recording unit between the conveyer rollers 661, 662 for conveying the color photosensitive material 660 so as to expose the same position simultaneously. In this case, the arrays of Selfoc lenses 664R, 664G, 664B are also provided between the color photosensitive material 660 and the recording heads 663R–663B.

Although the arrays of Selfoc lenses acting as the optical lens system are employed in the embodiments of FIGS. 33, 34, the recording heads can be placed directly in contact with the color photosensitive material, or arrays of micro lenses, or a lens unit may be provided. Moreover, arrays of laser diodes instead of light-emitting diodes are usable.

As set forth above, the recording heads according to the present invention are of a flat-plate construction, and the arrays of light-emitting elements such as light-emitting diodes are installed on the side faces thereof. Accordingly, the arrays of light-emitting element can be located close to the photosensitive material, even when a plurality of parallel color images are to be recorded, thereby contributing to the production of compact exposing components.

Figure 35:
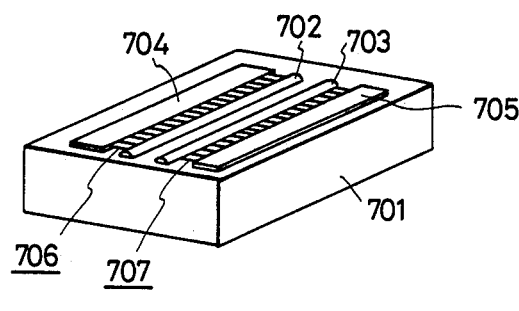
FIG. 35 is a perspective structural view of another recording head of the present invention.

FIG. 35 is a diagram showing still another embodiment of the present invention, wherein two arrays of light-emitting diodes 702 and 703 are installed in parallel on the surface of the flat plate base 701, and the drivers 704 and 705 are respectively provided on both the outer sides thereof. The array of light-emitting diodes 702 and the driver 704 are electrically connected by wire bonding or wire wrapping 706, whereas the array of light-emitting diodes 703 and the driver 705 are electrically connected by wire bonding or wire wrapping 707.

Figure 36:
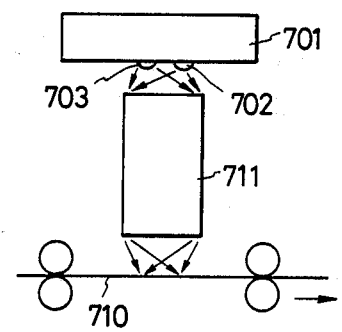
FIG. 36 is a constructional view of an exposure section using the recording head according to the present invention.

The two arrays of light-emitting diodes 702 and 703 installed on the surface of the flat plate base 701, together with the arrangement of the array of Selfoc lenses 711 acting as an image forming optical system provided opposite the color photosensitive material 710, as shown in FIG. 36, enables the color photosensitive material 710 to be exposed to the image light emitted from the arrays of light-emitting diodes 701 and 703 for the purpose of recording color images. In this case, the exposure unit of the color photosensitive material can be made compact since the two linear arrays of light-emitting diodes 702 and 703 are provided on the base 701.

Figure 37:
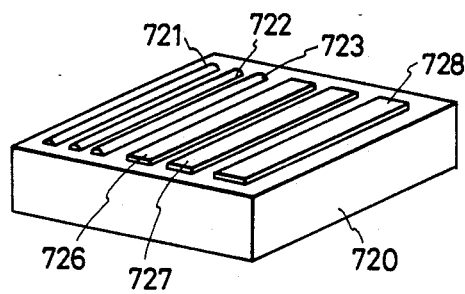
FIG. 37 is a perspective structural view of another embodiment of a recording head of the present invention.
Figure 38:
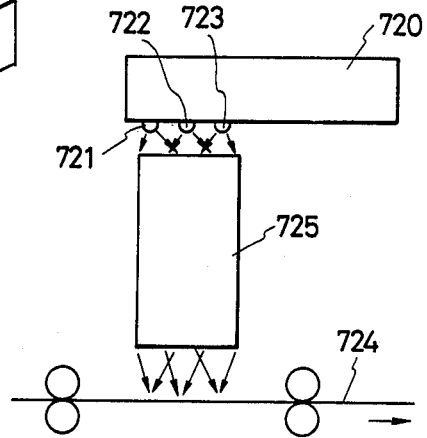
FIG. 38 is a constructional view of an exposure section of the recording head of FIG. 37.

FIG. 37 is a diagram showing still another embodiment of the present invention, wherein three arrays of light-emitting diodes 721, 722 and 723 are installed on the surface of the flat plate base 720 along the side edge faces thereof, and the corresponding drivers 726, 727 and 728 are also provided in parallel thereto, whereas, for instance, the array of light-emitting diodes 721 and the driver 726, the array of light-emitting diodes 722 and the driver 727, and the array of light-emitting diodes 723 and the driver 728, are electrically connected. This arrangement, together with the array of Selfoc lenses 725 acting as an image forming optical system provided opposite the color photosensitive material 724, enables the color photosensitive material 724 to be exposed to the image light emitted from the three arrays of light emitting diodes 721-723 for the purpose of recording color images. In this case, the exposure unit can be made compact since the three arrays of light-emitting diodes 721-723 are provided in parallel.

Figure 39:
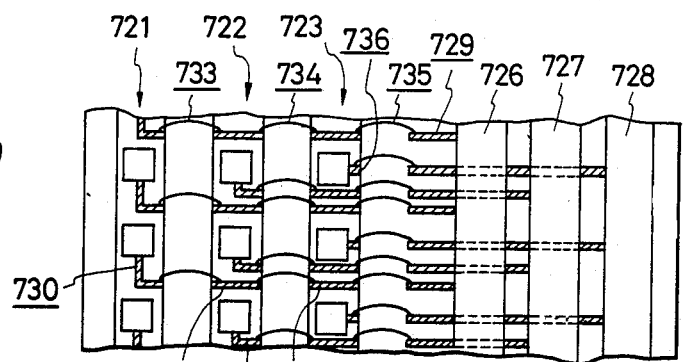
FIGS. 39 and 40 are constructional views of electrical connections in FIG. 37.
Figure 40:
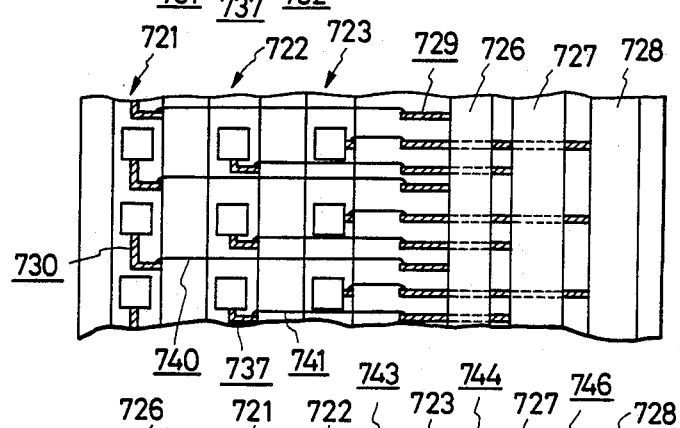
Figure 41:
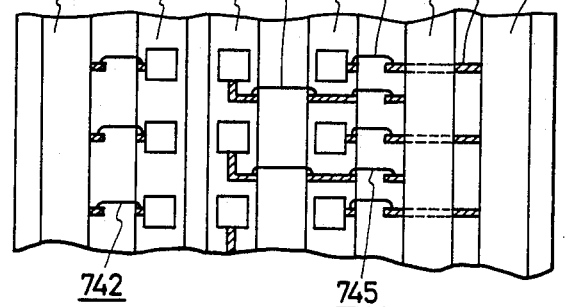
FIGS. 41 and 42 are constructional views of another electrical connection.

FIGS. 39 and 40 are diagrams showing examples of the connections between the arrays of light-emitting diodes 721-723 and the drivers 726-728, respectively. As shown in FIG. 39, an L-shaped circuit pattern 730 is provided between the picture elements of the array of light-emitting diodes 721, whereas a linear circuit pattern 731 and an L-shaped circuit pattern 737 are provided between the picture elements of the array of light-emitting diodes 722. Further, two linear circuit patterns 732 are provided between the picture elements of the array of light-emitting diodes 723 and a circuit pattern 736 connected to each picture element is provided, whereas a circuit pattern 729 corresponding to each picture element is connected to each of the drivers 726-728. The circuit patterns 730 and 731 are connected by wire bonding 733 and the circuit patterns 731 and 732 are connected by wire bonding 734, and further the circuit patters 737, 732 are connected with the circuit pattern 734. The circuit patterns 732, 729 are connected by wire bonding 735. As the above combination of the circuit pattern and the wire bonding is employed for connecting purposes, the arrays of light-emitting diodes 721-723 and the drivers 726-728 are electrically connected. As shown in FIG. 40, the circuit patterns 730, 737, 736 of the arrays of light-emitting diodes 721, 722 and 723 and the circuit patterns 729 of the drivers are connected by wire bonding 740 and 741, respectively.

FIGS. 741 is a diagram showing an example of a combination of the connections between the arrays of light-emitting diodes 721-723 and the drivers 726-728. In other words, the array of light-emitting diodes is positioned close to the driver 726, and the combination of the circuit pattern and the wire bonding 742 is employed to electrically connect them. The arrays of light-emitting diodes 722, 723 are provided on the same side, whereas the drivers 727, 728 are set close to each other. The combination of the circuit pattern and the wire bonding 743 and 745 is used to electrically connect the array of light-emitting diodes 722 to the driver 727, while the combination of the circuit pattern 746 and the wire bonding 744 is employed to electrically connect the array of light-emitting diodes 723 to the driver 728.

Figure 42:
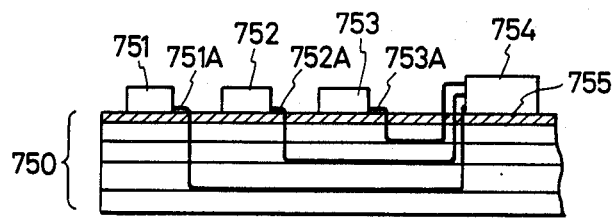

FIG. 42 is a diagram showing still another embodiment of the present invention, wherein three arrays of light-emitting diodes 751, 752 and 753 are installed along the side edge face of the flat plate base 750 and the driver 754 is provided on the surface thereof. The driver 754 and the arrays of light-emitting diodes 751, 752 and 753 are internally respectively connected with laminated circuit patterns 751A, 752A and 753A and a layer of common electrode 755 is placed on the surface thereof. With this arrangement, the recording head shown in FIG. 37 can be fabricated.

In the aforedescribed embodiment, although reference has been made to the provision of light-emitting diodes as the array of light-emitting elements, an array of laser diodes may also be employed. With respect to the three or two arrays of light-emitting diodes, use can be made of a device capable of emitting not only three-color RGB light, but also light having a wavelength corresponding to the coloring characteristics of the photosensitive material.

Figure 43:
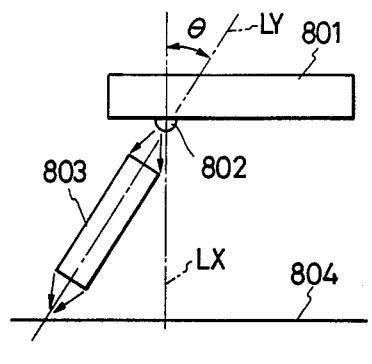
FIG. 43 is a constructional view showing another embodiment of the present invention.

FIG. 43 is diagram showing another embodiment of the present invention, wherein an array of light-emitting diodes 802 is installed along the end of the flat plate base 801, and the optical axis of the array of light-emitting diodes is set along a line LX. An arrays of Selfoc lenses 803 having an optical axis LY tiled by $\theta$ with respect to the optical axis LX is provided. The image light emitted from the array of light-emitting diodes 802 is focused by the array of Selfoc lenses into an image, whereby the image formed on the color photosensitive material is exposed. Since the array of Selfoc lenses having the optical axis LY tilted with respect to the array of light-emitting diodes 802 is employed, a compact exposure unit as shown in FIGS. 44 and 845 can be produced.

Figure 44:
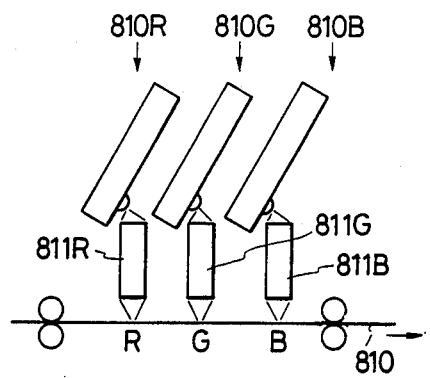
FIGS. 44 and 45 are diagrams showing exposure sections using the recording heads according to the present invention.

FIG. 44 is a diagram showing exposure parts for recording an image in full color, e.g., three primary color RGB, on the color photosensitive material, wherein recording heads 810R, 810G and 810B for emitting image light on an RGB basis ar installed in parallel. There are also provided arrays of Selfoc lenses 811R, 812G and 811B tilted with the respect to the optical axis of the arrays of light-emitting diodes of the recording heads 810R, 810G and 810B. The respective recording heads 810R, 810G and 810B are arranged with small intervals between the recording heads 810R, 810G and 810B so that a compact exposure unit can be provided in a smaller space.

Figure 45:
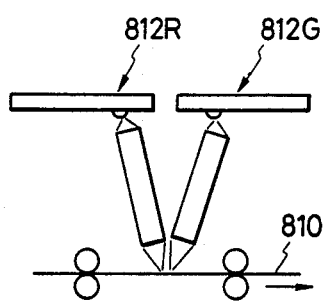

FIG. 45 is a diagram showing an exposure unit for use in recording a color image on color photosensitive material with two opposing recording heads 812R and 812G. In this example, the arrays of light-emitting diodes installed at the ends of the bases are placed face-to-face with the end edge faces of the bases installed opposite to each other so that image recording can be carried out simultaneously in the same linear position of the color photosensitive material 810. Although an R and G color image is recorded in this example, a combination of other colors is also possible.

Figure 46:
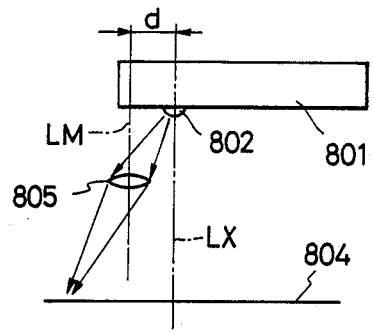
FIG. 46 is a constructional view of another embodiment of the present invention.

In the example of FIG. 43, the array of Selfoc lenses 803 having the optical axis LY tilted with respect to the optical axis of the array of light-emitting diodes 802 is provided. However, an arrays of micro lenses instead of Selfoc lenses may be used also tilted by an angle of $\theta$. As an angle of inclination $\theta$ of about 5° to 45° is preferred. As shown in FIG. 46, the installation of the array of micro lenses 805 having the optical axis LM in a position separated by d from the optical axis LX of the array of light-emitting diodes 802 makes it possible to construct the exposure units shown in FIGS. 44 and 45.

As set forth above, the recording head having the arrays of light-emitting elements installed along the ends of the flat plate base, together with the array of image forming optical elements tilted with respect to the optical axis of the array of light-emitting element, or the array of image forming optical elements having an optical axis shifted from the aforementioned optical axis in parallel, allows the space required for the plurality of parallel recording head to be minimized, thus enabling a compact exposure unit to be produced.

Figure 47:
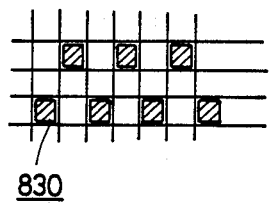
FIGS. 47 and 48 are diagrams descriptive of embodiments of the present invention.
Figure 48:
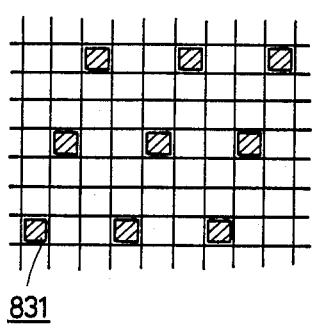

In the present invention, as shown in FIG. 47, the centers of the luminous areas of each of the light-emitting diodes 830 are set one recording picture element pitch apart from another. Such an arrangement decreases the crosstalk of the light from the adjoining light-emitting diode by a large margin and makes possible the recording of a wide-gradation high-quality image. FIG. 48 is a diagram showing an example wherein the centers of each of the luminous areas of the light-emitting diodes 831 are spaced apart by twice the recording picture element pitch, whereby the amount of crosstalk can be further decreased.

The present invention is effective particularly for exposing y-type photosensitive material with Y light. That is, Y color is generally low in luminous efficiency for the human eye and a slight amount of crosstalk does not significantly the influence image. In this case, the arrangement shown in FIG. 47 is sufficient to record a high-quality color image.

In the embodiment above, arrays of laser diodes instead of light-emitting diodes may be employed likewise.

As set forth above, since the centers of the luminous areas of the light-emitting elements of the recording head are located at lest ne recording picture element apart from another, amount of the crosstalk of light from the adjacent picture elements is nullified so that a wide-gradation high-quality color image can be recorded.

What is claimed is:

1. An image recorder comprising:
   means for conveying a color photosensitive material; and
   three linear arrays of light-emitting elements, each array emitting light having a different luminous wavelength and said arrays being arranged in a direction perpendicular to a direction in which said color photosensitive material is conveyed.

2. The image recorder as claimed in claim 1, wherein said color photosensitive material is a heat development photosensitive material.

3. The image recorder as claimed in claim 1, wherein said color photosensitive material is a pressure-sensitive photosensitive heat development photosensitive material.

4. The image recorder as claimed in claim 1, wherein said array of light-emitting elements comprises plurality of light-emitting diodes and an array of respective Selfoc lenses.

5. An image recorder comprising: means for conveying a color photosensitive material; a serial head having three linear arrays of light-emitting elements for emitting light having different luminous wavelengths and respectively arranged in a direction parallel to a direction in which said color photosensitive material is conveyed; and a scanning mechanism for moving said serial head in a direction perpendicular to the scanning direction.

6. The image recorder as claimed in claim 5, wherein said color photosensitive material is a heat development photosensitive material.

7. The image recorder as claimed in claim 5, wherein said color photosensitive material is a pressure-sensitive photosensitive material.

8. The image recorder as claimed in claim 5, wherein said array of light-emitting elements comprises a plurality of light-emitting diodes and an array of respective Selfoc lenses.

9. An image recorder for recording an image on a recording material comprising: a plurality of flat plate bases; and a plurality of recording heads, each provided with at least one array of light-emitting elements mounted on a respective one of said flat plate bases, the light-emitting elements of each of said recording heads emitting light in a respective different color, said arrays of light-emitting elements being mounted along side edge faces of said respective ones of flat plate bases, said side edge faces of said flat plate bases being arranged opposite to each other.

10. The image recorder as claimed in claim 9, wherein one array of said light-emitting element is mounted on each said flat plate base.

11. The image recorder as claimed in claim 9, wherein two arrays of said light-emitting elements are mounted on each said flat plate base.

12. An image recorder for recording an image on a recording material comprising: a plurality of flat plate bases; and a plurality of recording heads each provided with at least one array of light-emitting elements mounted on a respective one of said flat plate bases, the light-emitting elements of each of said recording heads emitting light in a different respective color, said arrays of light-emitting elements being mounted along side edge faces of said respective ones of said flat plate bases, said recording heads being overlapped in shifted layers so that said arrays of light-emitting elements are not overlapped.

13. An image recorder for recording an image on a recording material comprising: a plurality of flat plate bases; and a plurality of recording heads each provided with at least one array of light-emitting elements mounted on respective ones of said flat plate bases, said arrays of light-emitting elements being mounted along side edge faces of said respective ones of said flat plate bases, said recording heads being arranged radially in an arcuate form along a conveying path of said record in material.

14. A recording head comprising: a flat plate base; a plurality of linear arrays of light-emitting elements provided at side edge faces of said flat plate base; a plurality of drivers mounted on a surface of said base; and means for electrically connecting said arrays of light-emitting elements and said drivers.

15. A recording head comprising: a flat plate base; a plurality of linear arrays of light-emitting elements provided on a surface of said flat plate base; a plurality of drivers installed on a surface of said base, and means for electrically connecting said arrays of light-emitting elements and said drivers.

16. A recording head comprising: a flat plate base; a plurality of linear arrays of light-emitting elements provided along ends of said flat plate base; and a plurality of arrays of image forming optical elements tilted or shifted with respect to the optical axis of said arrays of light-emitting elements.

17. The recording head as claimed in claim 15, wherein said arrays of image forming optical elements comprise arrays of Selfoc lenses.

18. The recording head as claimed in claim 15, wherein said arrays of image forming optical elements comprise arrays of micro lenses.

19. An image recording head comprising: a base member; and a plurality of arrays of light-emitting elements arranged on said base as an image recording light source, centers of luminous areas of each of said light-emitting elements being spaced apart by at least one recording picture element pitch.

* * * * *